US012097418B2

(12) United States Patent
Trefz

(10) Patent No.: US 12,097,418 B2
(45) Date of Patent: Sep. 24, 2024

(54) PUMP CELL FOR MOBILE SURFING FACILITY INCLUDING RADIAL PUMP AND DIFFUSOR

(71) Applicant: Thilo Trefz, Hamburg (DE)

(72) Inventor: Thilo Trefz, Hamburg (DE)

( * ) Notice: Subject to any disclaimer, the term of this patent is extended or adjusted under 35 U.S.C. 154(b) by 0 days.

(21) Appl. No.: 18/575,973

(22) PCT Filed: Jul. 5, 2021

(86) PCT No.: PCT/EP2021/068465
§ 371 (c)(1),
(2) Date: Jan. 2, 2024

(87) PCT Pub. No.: WO2023/280375
PCT Pub. Date: Jan. 12, 2023

(65) Prior Publication Data

US 2024/0238658 A1 Jul. 18, 2024

(51) Int. Cl.
*A63B 69/12* (2006.01)
*F04D 29/42* (2006.01)
*F04D 29/44* (2006.01)

(52) U.S. Cl.
CPC ........ *A63B 69/125* (2013.01); *F04D 29/4293* (2013.01); *F04D 29/445* (2013.01); *F05D 2250/14* (2013.01); *F05D 2250/52* (2013.01)

(58) Field of Classification Search
CPC ............... A63B 69/125; F04D 29/4293; F05D 2250/52

(Continued)

(56) References Cited

U.S. PATENT DOCUMENTS 3,598,402 A * 8/1971 Frenzl ..................... B63B 32/00 4/496
4,905,987 A * 3/1990 Frenzi .................. A63G 31/007 472/117

(Continued)

FOREIGN PATENT DOCUMENTS

CN 1303722 A 7/2001
CN 1377291 A 10/2002

(Continued)

OTHER PUBLICATIONS

International Preliminary Report on Patentability for International Application No. PCT/EP2021/068465, mailed Jan. 18, 2024.

(Continued)

*Primary Examiner* — Huyen D Le
(74) *Attorney, Agent, or Firm* — Jason H. Vick; Womble Bond Dickinson (US) LLP

(57) ABSTRACT

It is disclosed a pump cell (25) for a surfing facility (10), wherein the pump cell (25) is configured to generate a, preferably laminar, layer-like water flow (20) for a surfable standing wave, wherein the pump cell (25) comprises: a pump (26), which is a radial pump (26) and has a preferably circular outlet opening; a diffusor (27) coupled to the pump (26) and being configured, to enlarge a cross-sectional area of the water flow (20) downstream of the pump (26) as far as an outlet opening (84) of the diffusor (27) and to reshape same into a wide and flat shape; and a pump frame (28), to which the pump (26) and the diffusor (27) are fastenable.

12 Claims, 9 Drawing Sheets

(58) Field of Classification Search
USPC .............................................................. 4/491
See application file for complete search history.

(56) References Cited

U.S. PATENT DOCUMENTS

| | | | | |
|---|---|---|---|---|
| 5,401,117 | A * | 3/1995 | Lochtefeld ......... | A63B 69/0093 4/491 |
| 10,501,953 | B2 | 12/2019 | Courtaigne | |
| 2005/0148398 | A1 | 7/2005 | Lochtefeld | |
| 2006/0026746 | A1 * | 2/2006 | McFarland .......... | A63G 31/007 4/491 |
| 2009/0133187 | A1 * | 5/2009 | Kim ................... | A63B 69/0093 4/492 |
| 2016/0002940 | A1 | 1/2016 | Courtaigne | |
| 2016/0199744 | A1 | 7/2016 | McCarthy | |
| 2017/0136373 | A1 | 5/2017 | Vicente | |

FOREIGN PATENT DOCUMENTS

| | | | |
|---|---|---|---|
| CN | 107715458 | A | 2/2018 |
| CN | 209833933 | U | 12/2019 |
| DE | 2319902 | A1 | 11/1974 |
| DE | 2837391 | A1 | 3/1980 |
| DE | 202018106453 | U1 | 2/2020 |
| KR | 102257360 | B1 | 5/2021 |
| WO | WO 01/08770 | A1 | 2/2001 |
| WO | WO 2005/066436 | A1 | 7/2005 |
| WO | WO 2014/131749 | A1 | 9/2014 |
| WO | WO 2018/188741 | A1 | 10/2018 |
| WO | WO 2021/051092 | A1 | 3/2021 |

OTHER PUBLICATIONS

Office Action (Including Translation) for corresponding European Patent Application No. 21746346.9, mailed Jun. 16, 2023.
International Search Report for International Application No. PCT/EP2021/068465, mailed Mar. 18, 2022.
Written Opinion for International Application No. PCT/EP2021/068465, mailed Mar. 18, 2022.
Intention to Grant for corresponding European Patent Application No. 21746346.9, mailed Sep. 13, 2023.
First Examination Report for corresponding Chinese Patent Application No. 202180100212.5, mailed Apr. 25, 2024.

* cited by examiner

PUMP CELL FOR MOBILE SURFING FACILITY INCLUDING RADIAL PUMP AND DIFFUSOR

CROSS REFERENCE TO RELATED APPLICATIONS

This application is a national stage application under 35 U.S.C. 371 of PCT Application No. PCT/EP2021/068465 having an international filing date of 5 Jul. 2021, which designated the United States, the contents of which are incorporated herein by reference in its entirety.

The present disclosure relates to a pump cell for an almost ubiquitous applicable mobile (i.e. transportable) surfing facility for generating a surfable standing wave (simulator for wave-water sports, such as surfing, body boarding, etc.), as well as to a corresponding surfing facility. Further, the disclosure relates to the use of a special pump in a surfing facility.

Hereinafter, such facility will also be briefly designated "surfing facility" or "facility" only. The facility has a modular structure. The modules include inflatable elements. The modules are configured to be stowed (preferably as weight-saving as possible) in trucks and/or freight containers for transporting the facility from one (event) location to another location.

Basically, there are two different types of conventional surfing facilities, namely mobile facilities and stationary facilities.

Stationary facilities are immobile, i.e. they are always located in one (single) place and are permanently installed there. Stationary facilities most times have a concreted (water) basin serving as a water reservoir. A surfable surface, over which a film of water or a surfable layer of water is directed or flowed and on which a user can perform surfing maneuvers, is usually also concreted or can be assembled from preformed glass-fiber mat portions. The manufacturing of the surfable surface, i.e. the corresponding ground, is complex and costly. The production of the surface of concrete is done manually and must be carried out by skilled workers able to shape the desired contour of the ground. The smallest unevenness in the surface can have a negative effect on the layer of water flowing over it.

US 2005/0148398 A1 proposes a stationary facility (e.g., in a water park), in which the surfable surface is realized by a trampoline-like tensioned membrane coupled laterally to a frame of the facility, which is fixed in or on the water basin, and oriented (progressively) ascending downstream relative to the horizontal. The frame (cf. FIG. 1 of US'398 A1) supports an outer frame surrounding the membrane laterally, i.e. left and right of the flow direction of the layer of water. The frame comprises tensioning spars, which are oriented transverse to the flow direction, arranged beneath and laterally to the membrane (cf. FIG. 4A of US'398 A1), and extend over the entire width of the membrane (and beyond the same). The tensioning spars are connected to lateral frame elements extending parallel to the flow direction (i.e. along the longitudinal direction). The tensioning spars can be pushed laterally to the outside by hydraulically pressurized actuators (not shown) transverse to the flow direction for tensioning the membranes in this transverse direction.

Advantages of a membrane are generally to be seen in that i.) the tension achieves sufficient desired stiffness of the surfable surface which supports the layer of water flowing over it and the surfer at the same time, that ii.) sufficient flexibility is provided in the vertical direction if the surfer falls, and specifically with US'398 A1 that iii.) the tension of the membrane can be adapted actively by corresponding pressurization of the actuators for simulating different surfing conditions (e.g., for adapting to the weight of the surfer).

In addition, the use of air cushions and foam supporting elements and the like is known for influencing the shape of the membrane—and thus the size and shape of the layer of water flowing over it.

US'398 A1 uses axial pumps for generating the flowing layer of water at the outlet speed (m/s) and with a quantity of water ($m^3$/h), which are required for surfing. The axial pumps can be installed vertically (cf. FIG. 2A of US'398 A1) or horizontally (cf. FIG. 2B of US'398 A1). Both cases require a very deep and large water basin for sinking the pumps sufficiently deep for safe operation. A large quantity of water is required, in particular to safely prevent air from being sucked-in during the operation of the pumps. The pumps need to be maintained by divers due to the size and installation depth thereof. The pumps must be operated at very high speeds (>2500 rpm) to ensure the water outlet speed and water outlet quantity required for surfing, leading to higher noise emission and sound emissions in higher frequency ranges (shrill turbine noise), which negatively effects the experience of surfing as an outdoor sport.

Mobile portable (i.e. in particular transportable) facilities are described, for example, in the documents US 2017/0 136 373 A1 and U.S. Pat. No. 10,501,953 B2. US' 373 A1 will be considered below in more detail.

US' 373 A1 shows a facility including an inflatable base element (cf. FIG. 4C of US' 373 A1), in which a U-shaped basic structure, which is open on one side, is coupled at a face end to a pump assembly (cf. FIGS. 3A, 3B, and 5C of US' 373 A1) for generating the water beam. During operation, the pump is installed in a horizontal lying manner. On the bottom of the basic structure, a plurality of identically shaped cylindrical supporting bodies is arranged in a grid pattern for supporting a wedge-shaped supporting body and a parallelepiped-shaped body, which define the surfing surface. The cylindrical supporting bodies are positioned within a water reservoir. Cylindrical supporting bodies are connected to each other through a grid-like pipe frame. The wedge-shaped supporting bodies and the parallelepiped-shaped supporting body are inflatable, and are put on top of the plurality of the cylindrical supporting bodies. The wedge-shaped supporting body is immediately adjacent in the flow direction to the pump assembly, and supports the surfable surface from below. The parallelepiped-shaped supporting body is downstream adjacent to the wedge-shaped body and serves as drainage element for (vertically) returning the water into the reservoir after the water flow has flown over the wedge. The pump assembly does not extend over the entire width of the surfable surface, but comprises outer lateral areas where returning water can also be fed to the water reservoir.

The configuration of the membrane, being arranged over the wedge-shaped body and the parallelepiped-shaped body, is not described in more detail in US' 373 A1. Fixation of the membrane to the basic structure is not described in more detail. Further, is it not described how to set up the mobile facility on differently configured grounds so that the water flow on the surfable surface is as uniform as possible in its width direction. US' 373 A1 assumes that the surface of the ground is oriented planar and horizontally. Ideally, this means that the ground surface coincidences with a level surface (horizontal surface) of the Earth's gravitational field.

It is an object of the invention to provide a pump cell for a ubiquitously applicable surfing facility, which provides a surfable water flow having improved properties and with less effort.

In particular, a standardized inexpensive pump that has already been tested in practice is to be used in a (mobile) surfing facility.

Preferably, less noise is to be produced when the wave is generated.

In particular, the simulated wave is to be generated with a flow speed that is as close as possible to the speed of a real wave normally ridden by a surfer (15-30 km/h), i.e. the speed should be less than or equal to 30 km/h.

This object is solved by a pump cell for a (mobile) surfing facility, wherein the pump cell is configured to generate a layer-like water flow, preferably laminar, for a surfable standing wave, wherein the pump cell comprises: a pump, which is a radial pump, preferably having a circular outlet opening; a diffusor coupled to the pump and configured to enlarge a cross-sectional area of the water flow downstream of the pump as far as an outlet opening of the diffusor and to reshape into a wide and flat shape; and a pump frame fastenable to the pump and the diffusor.

The developers have recognized that the use of a commercially available radial pump for the use in a mobile surfing facility is of great advantage. The corresponding pumps are cheap and already tested in practice. The pumps only need to be operated in a lying manner, which meets the requirement of having to store as little water as possible in the basin of the surfing facility.

The radial pumps operate at speeds that result in a low level of noise. This refers to the reduction of the sound pressure level, and in particular a shift to a low-frequency range by means of a slower rotational speed of the pump.

The radial pumps generate together with the diffusor a surfable water flow, which flows at a speed of less than or equal to 30 km/h and which is nevertheless surfable.

The water flow exits the diffusor without turbulences, unlike with axial pumps.

The radial pump can be installed in a compact, and in particular transportable, frame which can be arranged in a width direction directly adjacent to a further frame for generating a wider wave. The orientation of the water flow is achieved by simply positioning a second pump cell to a first pump cell.

Preferably, the pump comprises a pump housing which comprises, when the pump cell is used in the surfing facility, a vertically oriented inlet opening, wherein the outlet opening is oriented horizontally.

In particular, the pump further comprises a motor which is positioned outside a water reservoir, when the pump cell is used in the surfing facility, and comprises a drive shaft oriented vertically.

The filling height of the reservoir can be minimized, as the filling height, after consideration of a maximum immersion depth of the suction (so that the pump does not get stuck at the bottom of the reservoir), results from the maximum height of the pump housing, which must be filled completely with water for proper function. Preferably, a filling height of 40 cm and correspondingly low surface loads arise, which result therefrom, correlating with the most-common building regulations. This means that the surfing facility can be used in many different ways, for example, even in a parking garage.

The motor is freely accessible from above the water and can be easily maintained. The drive shaft is already oriented parallel to the shaft of the pump impeller, so that a complex shaft coupling is eliminated.

In particular, the pump frame comprises: a base plate; a mounting plate arranged, preferably via height-adjustable feet, spaced apart from base plate for forming an intake area of the pump, and fixedly connected to the pump and the base plate; and a frame configured to couple the diffusor in a predetermined orientation, which is parallel to the desired flow direction, to the base plate.

The pump frame can be mounted in advance for finally mounting the pump and the diffusor later, in particular at the site of the mobile surfing facility. With this mounting, the pump and the diffusor automatically align in a desired orientation. Elaborate adjustment work is eliminated and limited, if at best, to a bottom area of the pump frame.

The pump frame simplifies the scaling of the number of pump cells within a pump assembly, as the pump cells can be aligned with each other via the frames.

Preferably, the diffusor comprises, in a consecutive manner, downstream: an inlet portion having at a downstream end a cross section corresponding to the outlet cross section of the pump, and redirecting the water flow, which exits the pump horizontally, in an angle of preferably 20°-45° upward relative to the horizontal; a cross-section deforming portion configured to perform continuous cross-section enlargement and reshaping into a rectangular shape having a width many times greater than a height; and an outlet portion configured to redirect the water flow into the horizontal again.

There is no 90° deflection downstream to the pump that causes energy loss. The cross section is constantly widened, which suppresses turbulences in the water flow. The water jet horizontally exiting the pump is continuously reshaped into the flat and wide flow. The water flow is gently lifted (i.e. with low losses and free of turbulences) above the level of the water reservoir to the height of the surfing surface.

In particular, the pump is not self-priming and can be operated without a backing pump.

Further, this object is solved by a, in particular mobile, surfing facility comprising: a pump assembly including at least one pump cell in accordance with the preceding claims; and a supporting structure, preferably inflatable, configured to float on top of a water reservoir, which is defined by water within a basin, wherein the basin is formed by a basin bottom and a sidewall.

In particular, a membrane is further provided defining the surfable surface and being coupled laterally to the supporting structure and frontally to the frame.

During operation the membrane tensions itself in the longitudinal direction due to the water jet flowing over it, and has a tension that conveys a realistic surfing feeling. The water flow is slightly flexible in the vertical direction when the surfer rides on it. Even radical maneuvers are possible for ambitious users, as the surfing surface is vertically flexible, but remains tensioned nevertheless. Due to the flexible surface it is not possible that, for example, a board completely displaces the water underneath it and becomes suck tight on the surface.

In particular, the mobile surfing facility further includes the basin.

Further, the object is solved by use of a radial pump in a surfing facility as a pump for generating a layer-like water flow for a surfable standing wave.

Further, it is preferred when the pump assembly, and in particular the pump frame, is connected to a, preferably detachably mounted, cross beam extending in the transverse direction, wherein the membrane comprises in particular a bag at its downstream end being configured for permanently receiving the cross beam, so that the membrane, in the operational state, is tensioned by the water flow in the longitudinal direction.

In a particular configuration the membrane is stretched via a wedge such that the wedge supports the membrane in the operational state from below, wherein the membrane is connected laterally via tensioning elements to the support structure, so that the membrane is autonomously tensioned in the transverse direction.

Further, it is advantageous when the wedge has, along the transverse direction Y, a vertical cross section that can be influenced by an adjustable air pressure, so that the cross section is higher in the middle than laterally at the outside, and the membrane causes definition of lateral backflow grooves.

In particular, the facility further comprises a compressor for regulating the air pressures in the supporting structure and/or the wedge.

Preferably, the levelling device is arranged on a bottom side of the pump frame.

In particular, the levelling device is formed by: individually height-adjustable threaded feet; a plurality of shims, preferably of different thicknesses; and/or one or more gel cushions that can be positioned below the pump frame.

In an advantageous embodiment at least one level is provided for the horizontal alignment of the pump assembly in the longitudinal direction X and/or in the transverse direction Y, wherein preferably the transverse members and the longitudinal members of the frame serve as measuring surfaces for the levels.

It is understood that the above-mentioned and hereinafter still to be explained features cannot only be used in the respectively given combination, but also in different combinations or alone, without from the scope of the present invention.

Embodiments of the present disclosure are illustrated in the drawings and will be explained in more detail in the following description.

Figure 3:
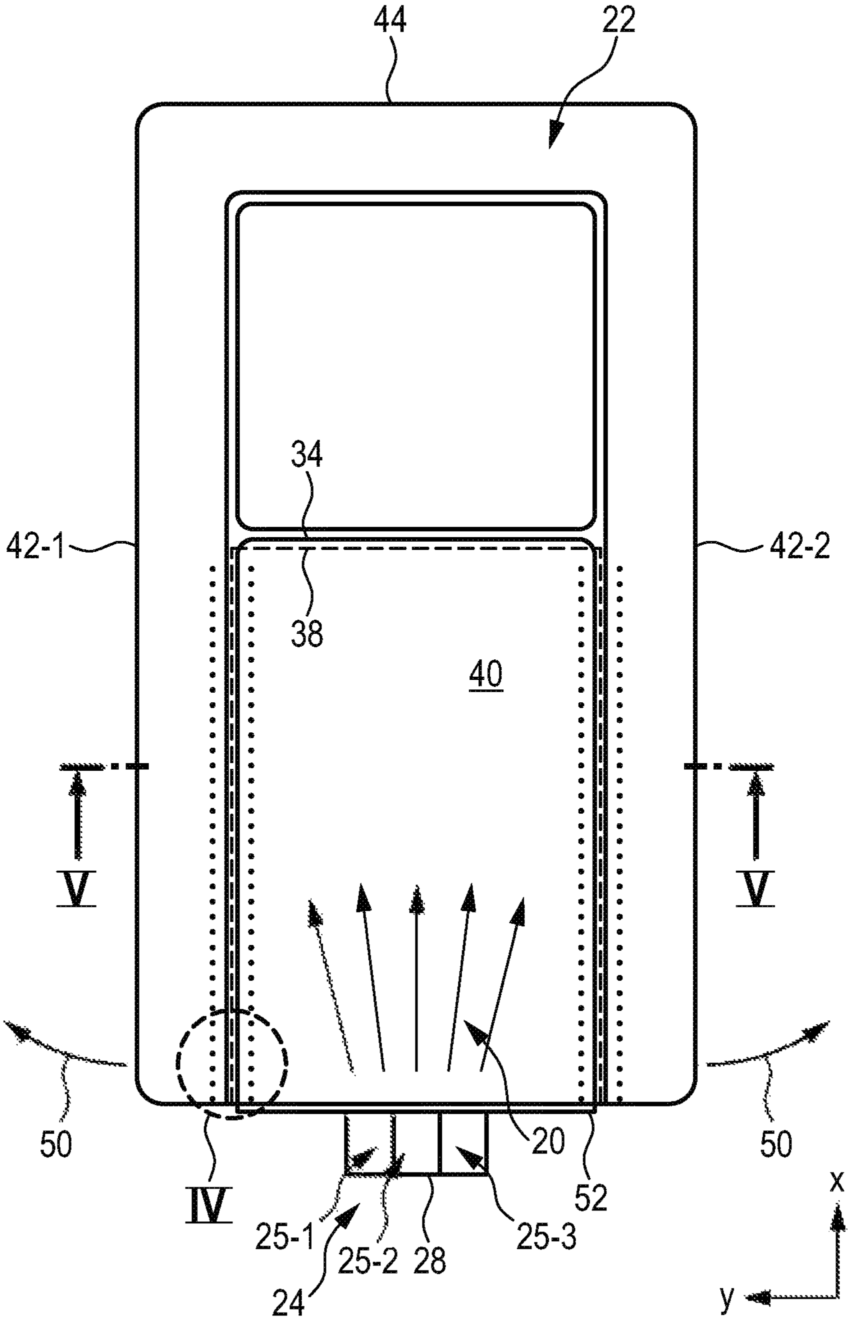
Figure 4:
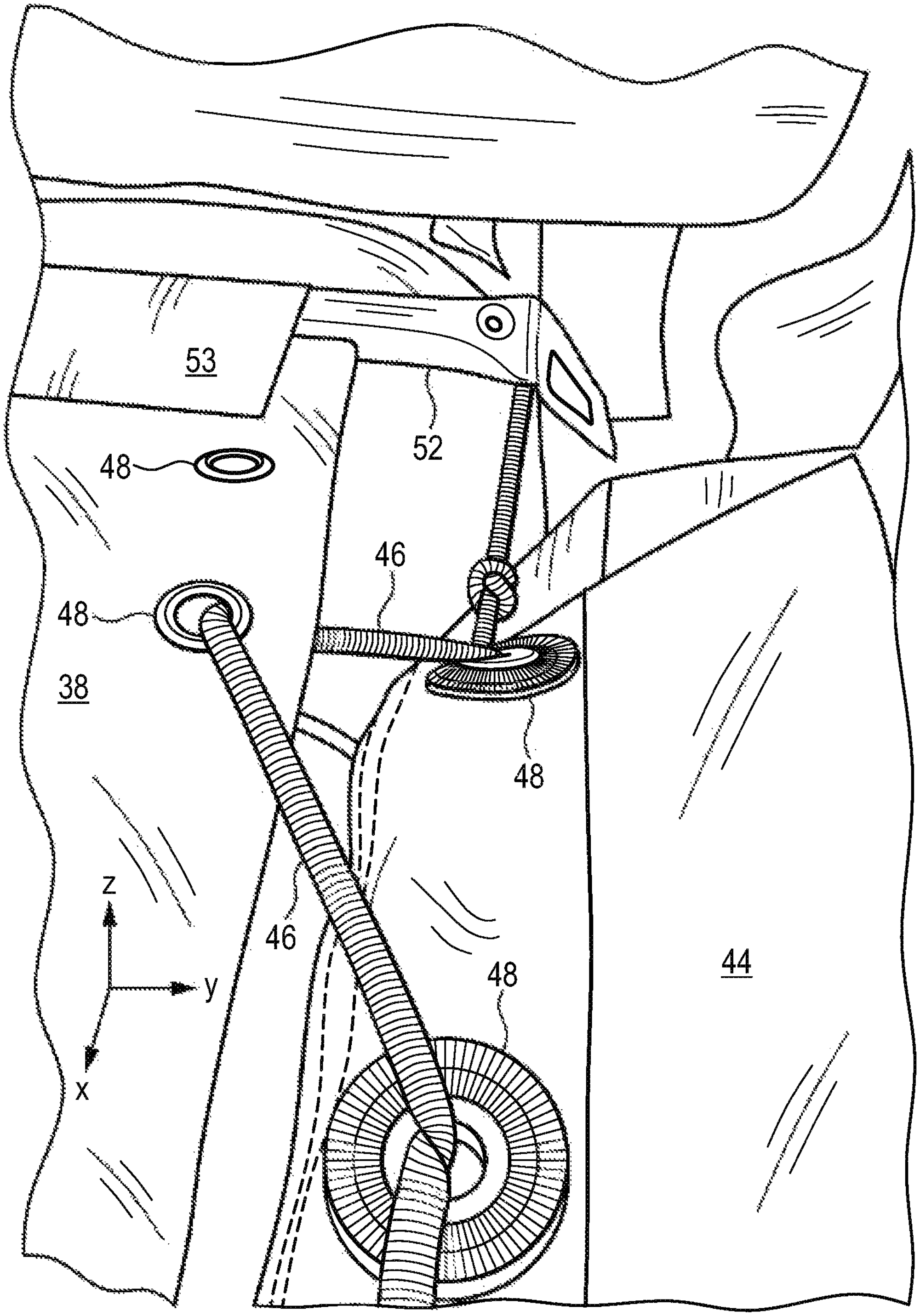

FIG. 2A-D show different views of a pump cell of a pump assembly;

FIG. 3 shows a top view of an isolated illustrated supporting structure receiving a wedge therein, across which a membrane is tensioned;

FIG. 4 shows a perspective view of a detail of FIG. 3; and

Figures 5A, 5B, 5C, 5D, 5E, 5F, 5G, 5H:
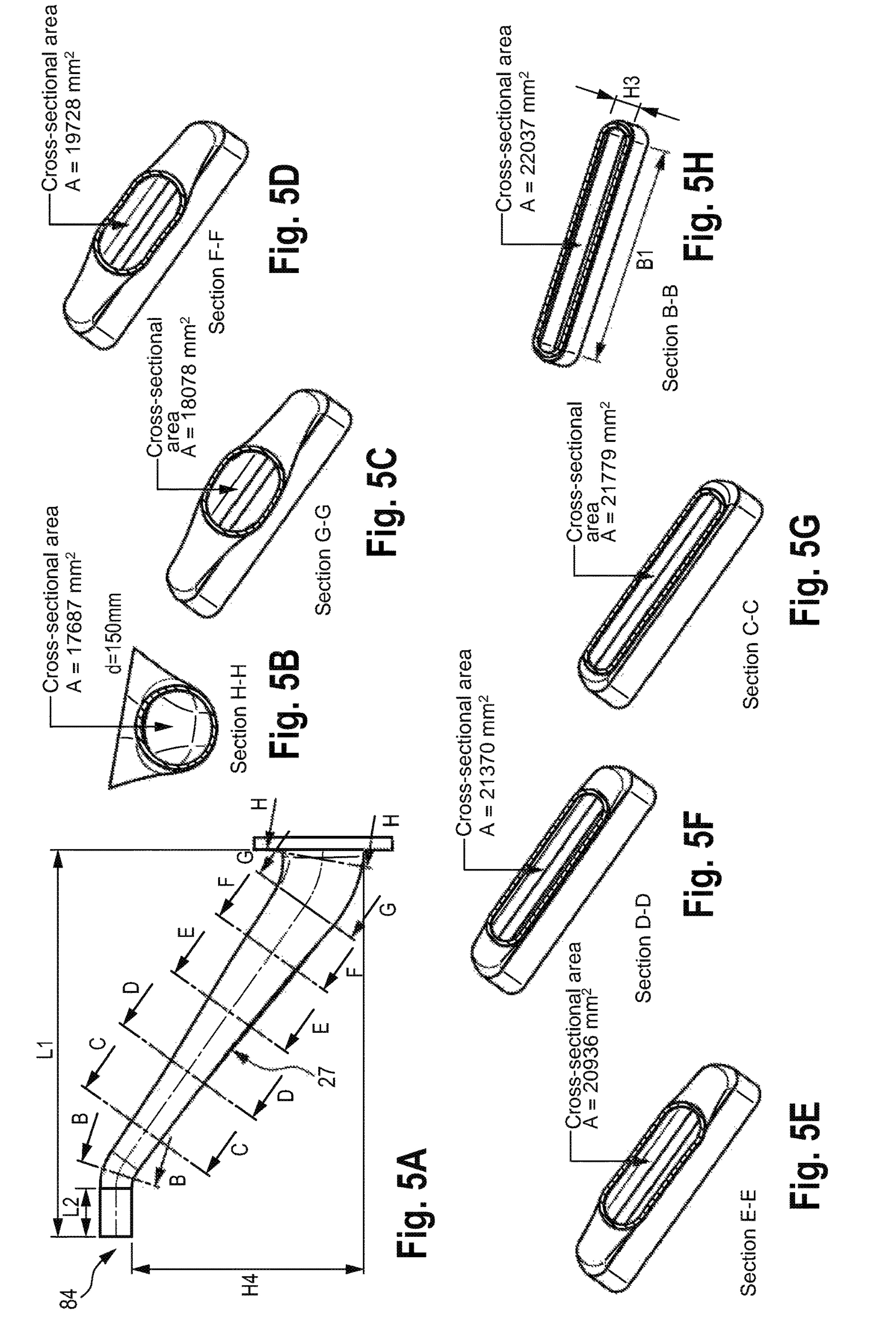

FIG. 5 shows a side view (FIG. 5A) of the diffusor of FIG. 2 as well as cross-section views (FIGS. 5B-H) along lines B-B to H-H in FIG. 5A.

Figure 1A:
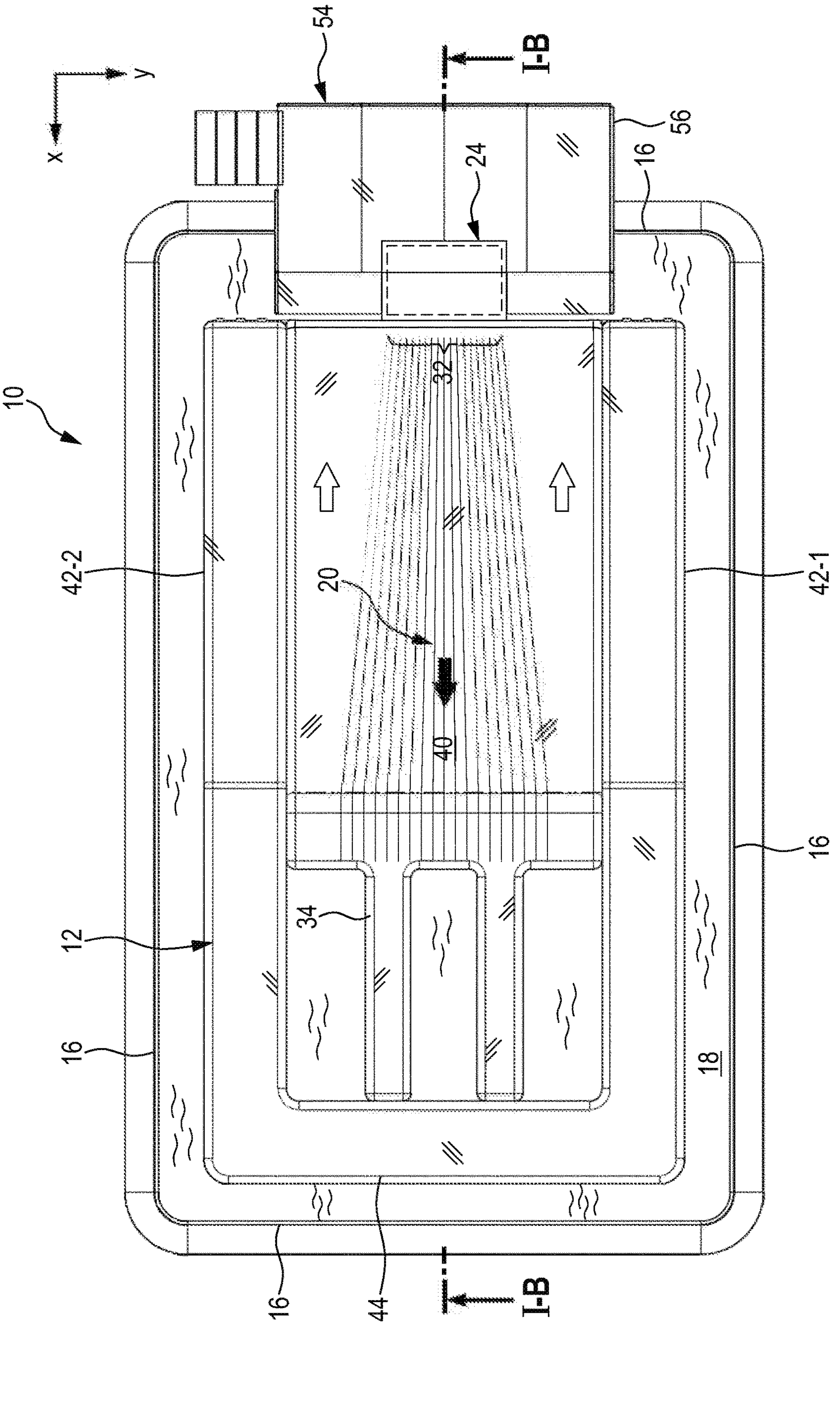
FIG. 1A shows a top view of a surfing facility.
Figure 1B:
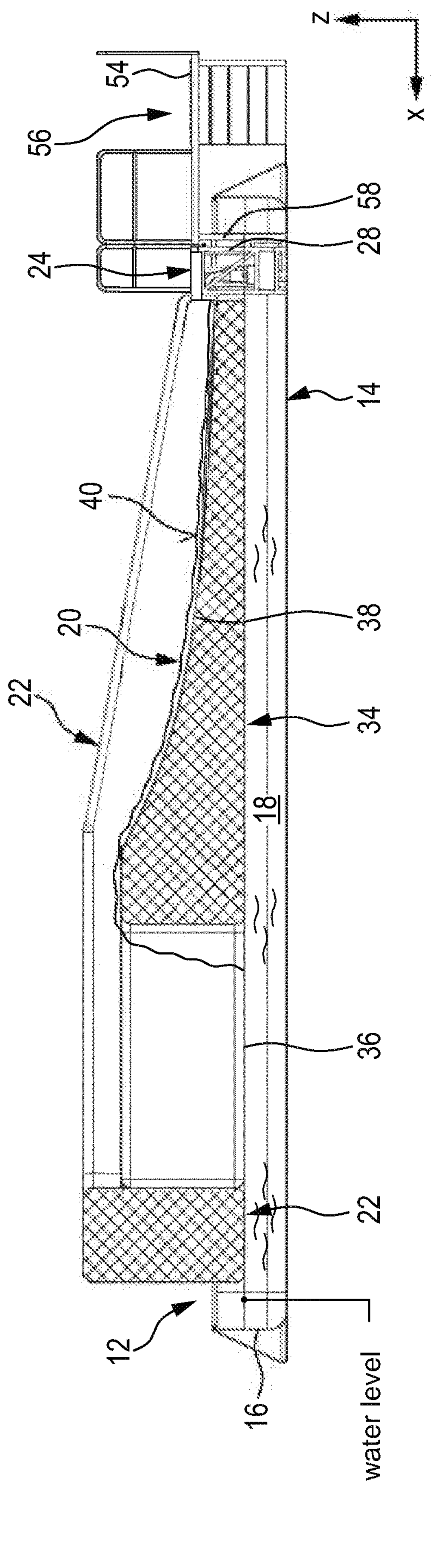
FIG. 1B shows a partially sectioned side view of the surfing facility of FIG. 1A.

Hereinafter, the general structure of a mobile and portable surfing facility (briefly "facility") 10 in accordance with the present disclosure will be described with simultaneous reference to the FIGS. 1A and 1B. FIG. 1A shows a schematic top view of the facility 10, and FIG. 1B shows a side view, illustrated partially sectioned along a line I-B-I-B in FIG. 1A. FIGS. 1A and 1B are not shown to scale. Furthermore, for easier orientation, a Cartesian coordinate system is shown in almost all figures, wherein a length, or length direction, is designated by X, a width, or transverse direction, is designated by Y, and a height, or height direction, is designated by Z.

In general, the facility 10 is characterized by a floatingly supported structure that aligns itself. Only a flow-generating drive needs to be positioned and, if necessary, levelled. The facility 10 operates with a relatively slow water flow (v less than or equal to 30 km/h), which can collapse more easily, but gives a more realistic surfing experience comparable to surfing in the open ocean. The water flow moves substantially parallel to the direction X and impacts preferably at a (flow) speed of about 30 km/h or slightly more on a surfable surface, or surfing surface, as will be still explained in more detail below. The water flow is stable and substantially laminar. The slower flow speed (conventional facilities are operated at speeds of 50-60 km/h) prevents, for example, that a user (surfer) gets sucked on the surfable surface with a bottom side of his/her sliding aid (surfboard, bodyboard, etc.) when cornering.

The facility 10 has a modular structure for being transportable. The modules of the facility 10 are designed such that they can be loaded in a dismantled state into a truck and/or into a freight container, in order to unload and set up the facility 10 at an arbitrary different location again.

A (first) optional module of the facility 10 is a basin 12 having a bottom 14 and a sidewall 16. In FIG. 1 the bottom 14 is positioned directly on ground (e.g., soil, hall floor, or the like), where the facility 10 is to be set up. The basin 12 of FIG. 1 is positioned above ground and is transportable, i.e. the basin 12 can be assembled and dismantled on site. The basin 12 can be inflatable.

It is understood that alternatively the basin 12 can be installed permanently in the ground, such as in a public or private swimming pool, in which case the basin 12 is no module of the facility 10.

The bottom 14 of FIG. 1 exemplarily has an area of about 126 $m^2$ (9m×14m). The bottom 14 extends substantially along the horizontal, i.e. the XY-plane. The (single-piece or multiple-pieces) sidewall 16 extends circumferentially around the bottom 14 and is oriented substantially vertical. The sidewall 16 usually has a height of 60 cm to 70 cm. When one speaks here of "substantially horizontal" or "substantially vertical", this means that smaller angular deviations of +/−5° compared to 0° or 90° and in particular tolerances are included.

The basin 12 of FIG. 1 can be defined, for example, by a circumferentially arranged frame, which is not designated in more detail here and over which a likewise unspecified awning is laid for defining the bottom 14 and the sidewall 16 (in one piece). It is understood that the bottom 14 and the sidewall 16 may be formed respectively also as multiple pieces, for example in terms of plates (not illustrated) which can be connected watertight to each other.

The basin 12 is open at the top and watertight. The basin 12 is filled with a predetermined quantity of water and serves as a water reservoir 18. The water of the water reservoir 18 is required for generating a flowing layer of water 20, which can also be designated equivalently as water flow 20, as will be explained in more detail below. The water reservoir 18 contains, for example, a quantity of water of 35.000 l.

A (floating) supporting structure 22 forms a further (second) module of the facility 10. Preferably, the supporting structure 22 is inflatable or is formed, for example, by foam elements. The supporting structure 22 is positioned in the basin 12 and floats on top of the water. The supporting structure 22 is supported floatingly in the basin 12.

In the top view (cf. FIG. 1A) the supporting structure 22 is formed preferably U-shaped or V-shaped for receiving a membrane 38 in its interior, which forms the surfing surface. The membrane 38 can form a further module of the facility that will be explained in more detail below.

The supporting structure 22 can comprise several (air-filled) elements coupled to each other for forming the U-shaped or V-shaped basic shape. The U-shape or V-shape is defined (in the top view) by two long, approximately parallel, legs 42 and one shorter leg 44 (cf. also FIG. 3) connecting the two parallel legs 42. The longer legs 42 extend in the operational state of the facility 10 substantially along the longitudinal direction X, whereas the short leg 44 extends at a downstream end along the transverse direction Y.

The "operational state" designates a state in which the facility 10 is completely set up, initially aligned, and the water flow 20 is active.

With the U-shape (cf. FIG. 1A) the two long legs 42 are oriented parallel to each other, wherein the shorter leg 44 is oriented perpendicular to the long legs 42. With the V-shape (not shown) the long legs 42 are only approximately oriented parallel to each other. Their relative distance decreases, however, downstream in the transverse direction Y. Both the U-shape and the V-shape have an open side (right in FIG. 1A) where a pump assembly 24 of the facility 10 is positioned at an upstream end of the supporting structure 22.

In the following, for the sake of simplicity it is assumed that the base surface of the supporting structure 22 is U-shaped in a resting state, i.e. without an active water flow 20. However, the supporting structure 22 can also have a rectangular base area.

The pump assembly 24 forms a further (third) module of the facility 10. The pump assembly 24 generates the water flow 20 by sucking water from the reservoir 18, accelerating and horizontally ejecting the same along the longitudinal direction X onto the membrane 38. The pump assembly 24 comprises at least one pump cell 25, which respectively includes a pump 26, a diffusor 27, and a pump frame 28 (cf. FIG. 2).

The pump 26 defines an intake area 30 of the pump assembly 24, which is located in the operational state of the facility 10 under water. Further, the pump 26 defines an outlet area 32 of the pump assembly 24, which is located above water in the operational state. The water flow 20 exits from the outlet area 32 under pressure as a convergent, divergent or parallel layer of water. The outlet area 32 is defined substantially by the diffusor 27, or an outlet opening 84 thereof. In the operational state of the facility 10, the basin 12 is filled so high with water, or with so much water, that the pump 26 is underwater, cf. H1 in FIG. 2B.

The pump 26 is mounted to the frame 28 such that, when the frame 28 is aligned (in X and/or Y) horizontally, the water flow 20 correspondingly exits (in X and/or Y) horizontally, as will be explained in more detail below.

Since the pump frame 28 (in the transverse direction Y) usually has a width less than the surfable surface 40, an elongated rod-shaped, or beam-shaped, cross beam 52 (cf. FIGS. 2B, 3, and 4), such as a round tube with an exemplary diameter of 30 mm and with a sufficient wall thickness of, for example, 3-4 mm, can be attached to the pump frame 28 and laterally protrude beyond the frame 28. For example, the cross beam 52 has a length substantially corresponding to the width of the surface 40. The cross beam 52 can be formed as one piece or in multiple pieces. The cross beam 52 is preferably provided at a front side of the assembly 24 so that the (not illustrated) membrane 38 can be immediately adjacent to an outlet area 32 of the water flow 20. The cross beam 52 is advantageously also arranged in a height immediately below the outlet area 32 so that the water flow 20 is streamed onto the membrane 38 as smoothly as possible.

In the operational state the cross beam 52 extends perpendicularly to the flow direction X, i.e. along the transverse direction Y. The pump assembly 24 is to be aligned correspondingly upon its set up.

The cross beam 52 can be welded to the frame 28. Alternatively, the frame 28 can be formed such that the cross beam 52 can be pushed longitudinally via a coupling into the frame 28, but nevertheless is fixed in the longitudinal direction X (cf. dashed line in FIG. 2B). The membrane 38 can comprise at its downstream end, for example, a bag 53 (cf. FIG. 4), into which the cross beam 52 can be pushed during the setting up or the mounting of the facility 10 (at the same time). It is understood that the bag 53 does not need to extend over the entire width of the membrane 38 in this case for also allowing engagement of the cross beam 52 in the frame 28.

Various types of connection are possible between the membrane 38, the cross beam 52 and the frame 52.

The pump 26 and the diffusor 27 of the pump cell 25 of FIG. 2 are fixed to the frame 28 and positioned, together with the frame 28, in the water reservoir 18 (spatially fixed). The pump 26 and the diffusor 27 are connected to each other and are usually premounted to the frame 28. Alternatively, the frame 28 is first positioned in the basin 12, which is preferably empty, at a desired location, and subsequently the pump 26 and the diffusor 27 are mounted to the frame 28.

Preferably, the pump assembly 24 includes three pump cells 25 arranged in the transverse direction Y directly adjacent next to each other for generating together the (one) water flow 20, which in this case is formed by three water jets overlapping at the edge. It is understood that even more or less pump cells 25 can be provided. One single cell 25 can be sufficient for generating the water flow 20.

A further (fourth) module of the facility 10 can be formed by a, preferably inflatable, wedge 34. The wedge 34 can be implemented by (e.g., an air-filled) element. The wedge 34 has a triangle cross section when viewed from the side (cf. FIG. 1B), so that the wedge 34 becomes higher and higher with increasing length. The wedge-shape can ascend linear or even curved (e.g., parabolic). In the top view the wedge 34 is substantially rectangular.

The dimensions of the wedge 34 are selected such that the wedge 34 fits with a preset tolerance at least in the transverse direction Y between the parallel long legs of the supporting structure 22.

The wedge 34 is arranged in the longitudinal direction X directly adjacent to the pump assembly 24. Thus, the pump assembly 24 is positioned in the longitudinal direction X opposite to the open portion of the U-shaped or V-shaped supporting structure 22 and opposite to the wedge 34 within the basin 12. The water flow 20 is directed downstream, i.e. in FIG. 1 in the positive longitudinal direction X, over the wedge 34, which is ascending downstream for defining an inclined plane for the surfer so that the surfer can move back and forth in the direction X and sideways in the direction Y on the water flow 20 due to gravity and the water pressure of the water flow 20 like on a real wave.

Downstream towards the ascending part of the wedge 34, the surfing surface can change into a (horizontal) (grid) portion having a constant height, which defines a drainage area where the water of the water flow 20 is directed vertically downward back into the water reservoir 18 in order to re-circulate. Alternatively, a separate, preferably parallelepiped-shaped and inflatable, floating backflow element 36 can be provided, which adjoins the wedge 34 downstream and is dimensioned such that (in top view) it is positively engaged with the wedge 34 inside the U-shaped or V-shaped the supporting structure 22. The drainage area of the wedge 34 or the backflow element 36 comprises a structure (e.g., vertical channels, a horizontal grid which is open downward, or the like) which is water-permeable in order to return the water flowing over the wedge 34 back into the reservoir 28.

It is understood that the supporting structure 22 and the wedge 34 can also be formed as one single (e.g., inflatable) part.

A further (fifth) module of the facility 10 can be formed by the membrane 38 covering the top side of the wedge 34 largely or completely. Preferably, the membrane 38 covers both the ascending part of the wedge 34 and at least one part of the portion having the constant height, which adjoins downstream to the ascending part of the wedge 34.

Preferably, the membrane 38 is made of e resilient material (e.g., a Panama-awning) with 900 g/m$^2$ or also a "PVC awning for trucks". Such membrane 38 can be tensioned over the wedge 34, and optionally also at least partially over the return element 36 for defining the surfable surface, i.e the surfing face, 40 over which the layer 20 of water is streamed, on which the surfer can surf and/or slide.

Alternatively, the layer 20 of water can also be streamed directly over the wedge 34, i.e. the membrane 38 can also be eliminated, in particular when the surface of the wedge 34, or the supporting structure 22, is correspondingly designed.

FIG. 3 shows a schematic top view of the supporting structure 22 illustrated in isolation, which has received the wedge 34 substantially positively engaged therein. The basin 12, the starting jetty 54 (cf. FIG. 1), and the stage 56 (cf. FIG. 1) are not illustrated in FIG. 3 for the purpose of simplifying the explanation. In FIG. 3 the membrane 38 is indicated by a dashed line. The membrane 38 can be tensioned between long legs 42-1 and 42-2 of the supporting structure 22, so that the membrane 38 covers the wedge 34 completely. This mechanical (pre) tension substantially acts in the transverse direction Y.

As soon as the water flow 20 is active, which exits in FIG. 3 from outlet openings (not designated) of the pumps 26 of the pump assembly 24 and is indicated by a plurality of (not designated in more detail) arrows in FIG. 3, when the pump assembly is in operation, the membrane 28 is additionally tensioned by the pressure of the water flow 20, substantially in the longitudinal direction, i.e. in the flow direction X, but also in the transverse direction Y. These additional (tensioning) forces (cf. arrows 50) cause the long legs 42 in the open area of the U-shaped base area of the supporting structure 22 to be pushed further to the outside than in the vicinity of the short leg 44 in the transverse direction Y. As a result, the U-shaped basic shape may approach a V-shape.

The membrane 38 can be connected via tensioning elements 46 (e.g. ropes, preferably resilient), as shown in the detail view of FIG. 4 which shows an enlarged section of FIG. 3 (cf. circle IV there), to the long legs 42.

For this purpose, the membrane 38 and the legs 42 can comprise, for example, (through) holes 48, which are exemplarily provided with eyelets through which the tensioning element(s) 46 can be guided. For example, elastic ropes, rubber-expander ropes, etc. can be used as the tensioning elements 46 which are guided, preferably with a special knotting technique through the holes 48 of the membrane 38 and the legs 42, so that the membrane 38 tensions itself under load by the (vertically acting) weight force of the surfer and/or by the pressure of the water flow 20, in particular in the transverse direction Y.

This kind of connection allows the U-shaped basic shape of the supporting structure 22 to be deformed into V-shape in operation by pushing the long legs 42 in an area closed to the pump by means of the water flow 20 exiting transversely to the outside.

Further, this kind of suspension of the membrane 38 generally causes a self-regulating system which ensures that the water flow 20 has a constant thickness (in the height direction Z) over its entire width (in the transverse direction Y). In addition, there are fewer flow breaks. Should a flow break nevertheless occur, so that the water flow 20 is not streamed uniformly laminar any longer, as preferred, over the surfable surface 40 and thus results, for example, in an uncontrollable turbulent—and thus badly surfable or non-surfable—flow, the preferred type of water flow quickly builds up again. Hence, the user only needs to wait briefly until ideal surfing and flow conditions prevail on the surface 40. The water can flow back laterally, as indicated by light arrows in FIG. 1A.

To amplify the effects mentioned above, the membrane 38 can also be connected at its upstream end, i.e. opposite to the pump assembly 24, to the pump assembly 24 and in particular to the pump frame 28 or the frame 71, in particular by using a rod-like cross beam 52 (cf. FIG. 4). In this case, the membrane 38 is also connected, substantially over its entire width in the transverse direction Y of the surfable surface 40, to the pump frame 28, as shown in FIG. 3. "Substantially across the entire width" means that the membrane 38 is connected to the pump assembly 24 beyond a width of the pump assembly 24. In ideal case, the membrane 38 is connected over its entire width to the pump assembly 24. Also, slightly deviating widths of +/−10-25%, preferably 5-10%, are still acceptable.

In the following, the pump cell 25 will be described in more detail, which is one of the core elements of the present disclosure.

Figure 2A:
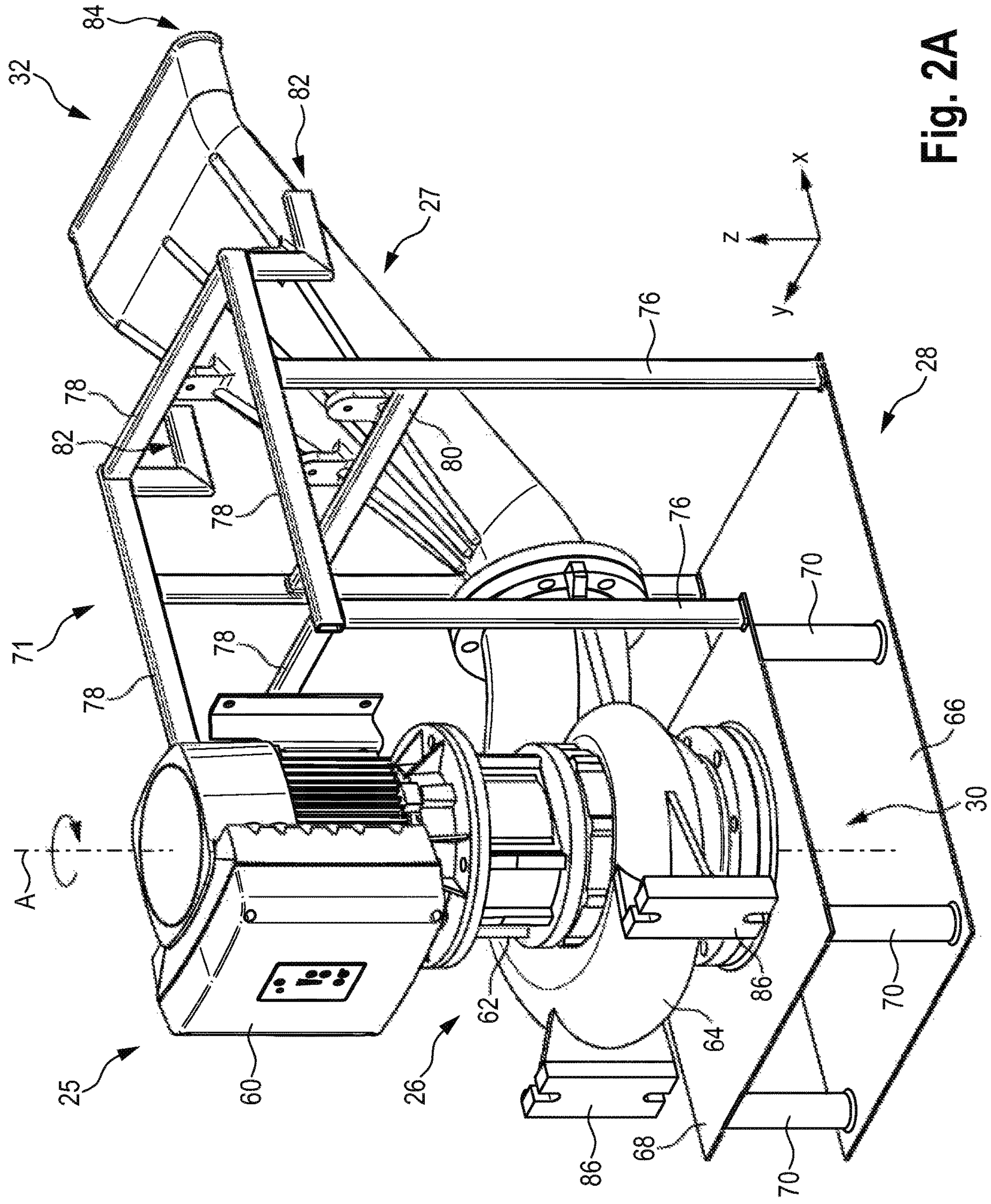

In FIGS. 2A (perspective), 2B (side view), 2C (front view), and 2D (top view) one of the pump cells 25-1 to 25-3 of FIG. 3 is exemplarily illustrated alone. It is understood that the following explanations apply to each of the pump cells 25 of a pump assembly 24.

In general, the pump 26 is a radial pump. Radial pumps are centrifugal pumps in which the conveying medium (here: water) exits radially, i.e., perpendicular to a pump shaft (not illustrated) oriented vertically in FIG. 2A, which rotates about an axis A in FIG. 2A, from a (not illustrated, horizontally oriented) impeller or pump wheel. Contrary to axial pumps, flow deflection within the impeller allows the centrifugal force to be used for higher conveying pressures, wherein the volume flow, however, is reduced correspondingly. The medium, which is to be conveyed, enters the pump 26 vertically via a (not illustrated) suction pipe, is captured by the rotating pump impeller, and is carried outwards on a spiral path. Due to the expansion of the area between the (not illustrated) vanes of the pump impeller a radial speed of the water decreases towards the (radial) outside, while at the same time a tangential speed—and thus the pressure—increases.

The pump 26 includes a motor 60, a (shaft) coupling 62, and an impeller (not illustrated), as shown in FIG. 2A. The impeller, i.e. the running wheel or pumping wheel, is arranged within a spiral-shaped (pump) housing 64, which can be recognized well in the top view of FIG. 2D. At the radial inside the housing comprises a circular portion adjacent to a radial outer spiral-shaped portion. The pressure and momentum (mass times tangential speed) of the pump wheel convey the accelerated water into a pipe portion 63 of the housing 64 (cf. FIG. 2D), which is oriented tangentially and to which an end portion 65 is adjoining which causes the generated water jet to exit parallelly to the direction X with a circular cross section (diameter 150 mm). The diffusor 27 is (sealed) connected with its inlet opening to the outlet opening of the pump 26 for i.) changing the cross section of the water jet from circular to rectangular flat, and for ii.) overcoming a height difference between the outlet opening of the pump 26 and the membrane 38, i.e. the surfing surface 40, cf. FIG. 2B.

Preferably, the motor 60 is a controllable electric motor, which can be operated at a maximum speed of 1,500 rpm.

The frame 28 includes a base plate 66, a mounting plate 68, feet 70 between the plates 66 and 68, as well as a multi-part frame 71, as shown in FIG. 2A.

The base plate 66 is preferably rectangular, about 100 cm long, and about 60 cm wide. The base plate 66 is preferably made of metal, and in particular about 5 cm high for being sufficient heavy to fix the pump 26 in operation within the basin 12 only due to gravity. This means that the pump cell 25 is preferably fixed by its own weight, to which even the weight of the base plate 66 contributes.

Also, the mounting plate 68 is preferably formed rectangular and has, for example, a length of about 60 cm and the identical width as the base plate 66. Preferably, the mounting plate 68 is also made of metal, and is 5 cm high. The mounting plate 68 is arranged vertically spaced (distance is, e.g., about 20 cm) in its corners via feet 70 to the ground plate 66 for defining a space between the plates 66 and 68, from which the pump 26 can soak water into its interior. The feet 70 are preferably arranged in a downstream end section of the plate 66. Hence, the pump 26 soaks water from the reservoir 18 perpendicularly upward. It is important to prevent the pump 26 from sucking in air or an air-water-mixture, because the radial pump 26 is not self-priming. No backing pump is or should be used. This means that the pump housing 64 preferably remains completely under water so that the interior of the pump 26 is always filled with water, and remains filled.

The mounting plate 68 has a central hole (not illustrated), to which an inlet opening of the pump housing 64 is coupled, in particular via a sealing ring 72. The central hole is circumferentially surrounded by a ring of holes (not illustrated) which is formed congruent with a ring of holes of the housing 64, in order to fixedly connect the pump 26 to the frame 28. Screws (not illustrated) are used for the connection.

Optionally, a ring 74 (cf. FIG. 2B) can be provided for shifting the intake opening, or inlet opening, of the pump 26 further down, i.e. deeper into the reservoir 18. The ring 74 is arranged coaxially to the axis of rotation of the pump 26, and is adapted to the central hole in the mounting plate 68 (and the congruent inlet opening of the pump) and is preferably about 7 cm high.

Further, optional reinforcing struts (not illustrated) can be provided at the bottom side and/or the top side of the mounting plate 68, preferably starting star-shaped from the central hole, so that the mounting plate 68 can better receive and transmit the high weight and the great forces generated by the pump 26 during operation.

The frame 71 comprises several parts. The frame 71 includes several legs 76, beams 78, and optional (transverse) struts 80. Further, the frame 71 can comprise, in a downstream end section, connecting members 82 for coupling the rod-like cross beam 52, to which the membrane 38 is mounted, to the pump assembly 24, as will still be explained in more detail below.

The legs 76 extend vertically and are fixed to the plates 66 and 68 in respective downstream end sections of the plates 66 and 68. The beams 78 extend horizontally, and are fixed to upper ends of the legs 76. The beams 78 are configured to support the starting jetty 54 (cf. FIG. 1), where the surfer starts his/her ride.

The struts 80 serve for stabilizing the legs 76, and can extend in all directions, although only one single strut 80 is shown in FIG. 2, which extends in the transverse direction Y. The strut 80 of FIG. 2 also serves for fixing the diffusor 27 to the frame 71, as will still be explained in more detail below.

Figure 2B:
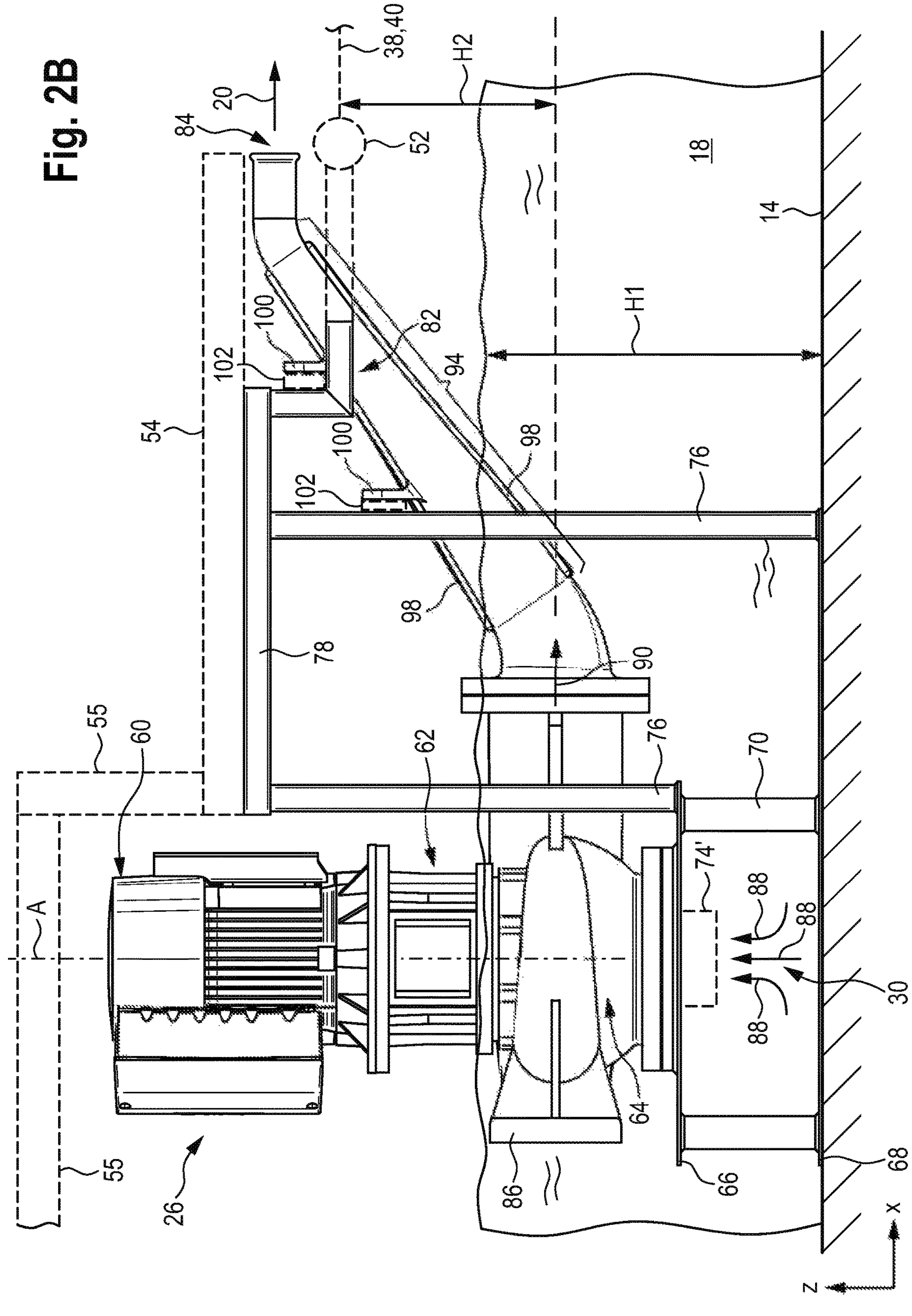

The starting jetty 54, i.e. the platform on which the surfer stands at the beginning for subsequently entering the surfing surface 40, can be implemented by a conventional standard stage scaffolding that has a standard width of 200 cm, beneath which three of the pump cells 25 can be arranged next to each other (in the direction Y). The starting jetty 54 is indicated in FIG. 2B by dashed lines, and extends in the flow direction X preferably as far as an outlet opening 84 of the diffusor 27, as illustrated in FIG. 2B. The surfer standing on the starting jetty 54 gets the feeling that the water flow 20 emerges from nowhere. The surfing surface 40 is not visible to the surfer. Therefore, the surfer gets transmitted the impression of a perfect real wave.

One or more additional cladding elements 55 can adjoin to the starting jetty 54, for example, in order to cover the motor 60, as indicated in FIG. 2B by dashed lines. This motor cover can also be used as a seating area.

In FIG. 2 the pump 26 is shown in a position assembled into the surfing facility. In this position, the housing 64 of the pump 26, which is typically operated while standing on the feet 86 thereof, is tilted into the horizontal for sucking in the water vertically, cf. arrows 86 in FIG. 2B between the plates 66 and 68, and for discharging horizontally, cf. arrow 90 in FIG. 2B. In this position, the housing 64 is completely under water. With other words, the pump 26 is operated upright, when used as determined (e.g. as water pump in a house). In this use, the pump 26 stands on the feet 86 so that the inlet opening is oriented horizontally and the outlet opening is oriented vertically (upward). However, when the (radial) pump 26 is used in the surfing facility 10, the pump 26 lies in a horizontally aligned manner. The inlet-opening coupling (ring of holes), to which a water line (pipe) is normally connected, is used for the fixation of the pump 26 to the frame 28 and as an intake opening being in direct contact to the water of the reservoir 18.

The (lying) use of (actually upright operated) radial pumps 26, in particular in combination with a respective diffusor 27, as pumps in mobile surfing facilities 10 is a separate invention.

The technical data of the pump 26 of the present disclosure is represented in the following table 1.

TABLE 1

| |
|---|
| Standard-priming one-stage centrifugal pump according to ISO 5199 having dimensions and rated performance in accordance with EN 733 (10 bar). The pump is equipped with PN 10 flanges. The dimensions comply with EN 1092-2. The pump has an axial suction nozzle and radial discharge nozzles as well as a horizontally arranged shaft. The process design allows dismantling the motor, the motor lantern, the cover, and the impeller without having to separate the pump housing from the piping. |
| The pump is directly connected to a fan-cooled asymmetric motor. For speed control, the motor has a frequency converter and PI regulator which are housed in the terminal box of the motor. The electronic speed control enables continuous adjustment of the motor speed, and thus of the pump performance to the current demand. |

| | |
|---|---|
| Type of control: | |
| Frequency converter: | integrated |
| Conveying medium: | |
| Conveying medium: | water |
| Temperature range of medium: | 0 . . . 120 ° C. |
| Temperature of medium during operation: | 20 ° C. |
| Density: | 998.2 kg/$m^3$ |
| Technical data: | |
| Pump speed on which the pump data are based: | 1460 1/min |
| Rated conveying flow: | 380 $m^3$/h |
| Rated conveying height: | 8,415 m |
| Actual impeller diameter: | 213 mm |
| Nominal impeller diameter: | 200 mm |
| GLRD arrangement: | single gliding linkage |
| GLRD code: | BAQE |
| ISO certification class: | ISO 9906:2012 3B |
| Materials: | |
| Pump housing: | grey cast iron |
| Pump shell: | EN-GJL-250 |
| Pump casing: | ASTM class 35 |
| Wear ring: | brass |
| Impeller material: | grey cast iron |
| Impeller: | EN-GJL-200 |
| Impeller material according to ASTM: | ASTM class 30 |
| Shaft: | stainless steel |
| Shaft: | EN 1.4301 |
| Shaft: | AISI 304 |
| Installation: | |
| Maximum ambient temperature: | 40 ° C. |
| Maximum operation pressure: | 10 bar |
| Pipe connection standard: | EN 1092-2 |
| Size of suction nozzle: | DN 200 |
| Size of pressure connection: | DN 150 |
| Nominal pressure rating: | PN 10 |
| Pump housing with feet: | yes |
| Support block: | N |
| Electric data: | |
| IE efficiency class: | IE3 |
| Rated motor power P2: | 11 kW |
| Main frequency: | 50 Hz |
| Rated voltage: | 3 × 380-480 V |
| Rated current: | 22.0-17.8 A |
| Power factor 005 phi: | 0.91-0.90 |
| Standard speed: | 240-1750 1/min |
| Efficiency: | IE3 91, .4% |
| Motor efficiency at full load: | 91.4% |
| Motor poles: | 4 |
| Protection class (according to IEC 34-5) | IP55 |
| Thermal class (IEC 85) | F |
| Motor-product number: | 86906207 |
| Other: | |
| Minimum efficiency index MEI &#8805: | 0.70 |
| Net weight: | 289 kg |
| Gross weight: | 322 kg |

Next, the diffusor 27 will be looked at closer. In general, the diffusor 27 is an element decelerating flows and increasing the (static) pressure (Bernoulli equation), i.e. the pressure acting at an outlet opening on an inner pipe wall. The diffusor 27 acts like a nozzle in reverse. The diffusor 27 is technically used for converting the kinetic energy into pressure energy. For this purpose, the flow is decelerated by expanding a (flow) cross section (continuously or discontinuously). This means that the inlet area of the diffusor 27 is smaller than the area of the outlet opening 84. Thus, the water flow 20 exits the diffusor 27 at a lower speed (preferably less than or equal to 30 km/h) than from the pump 26, however at a higher (static) pressure, which is beneficial for the surfer. The pump 26 outputs at its outlet opening (diameter 150 mm and area of about 17,671 $mm^2$) a quantity of water of 380 $m^3$/h at a flowing speed of about 7 m/s at a pressure of about 1 bar.

Figure 2C:
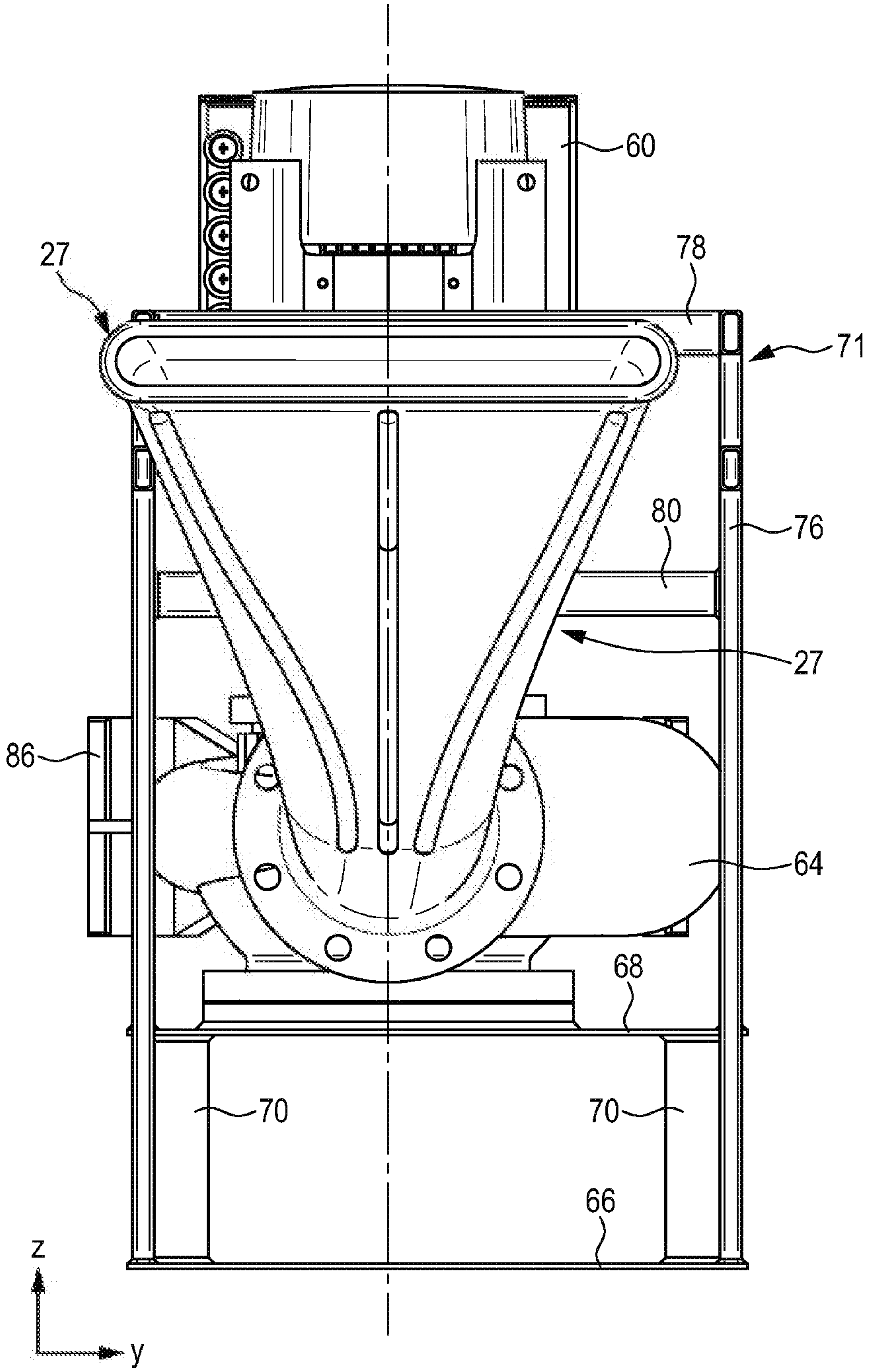
Figure 2D:
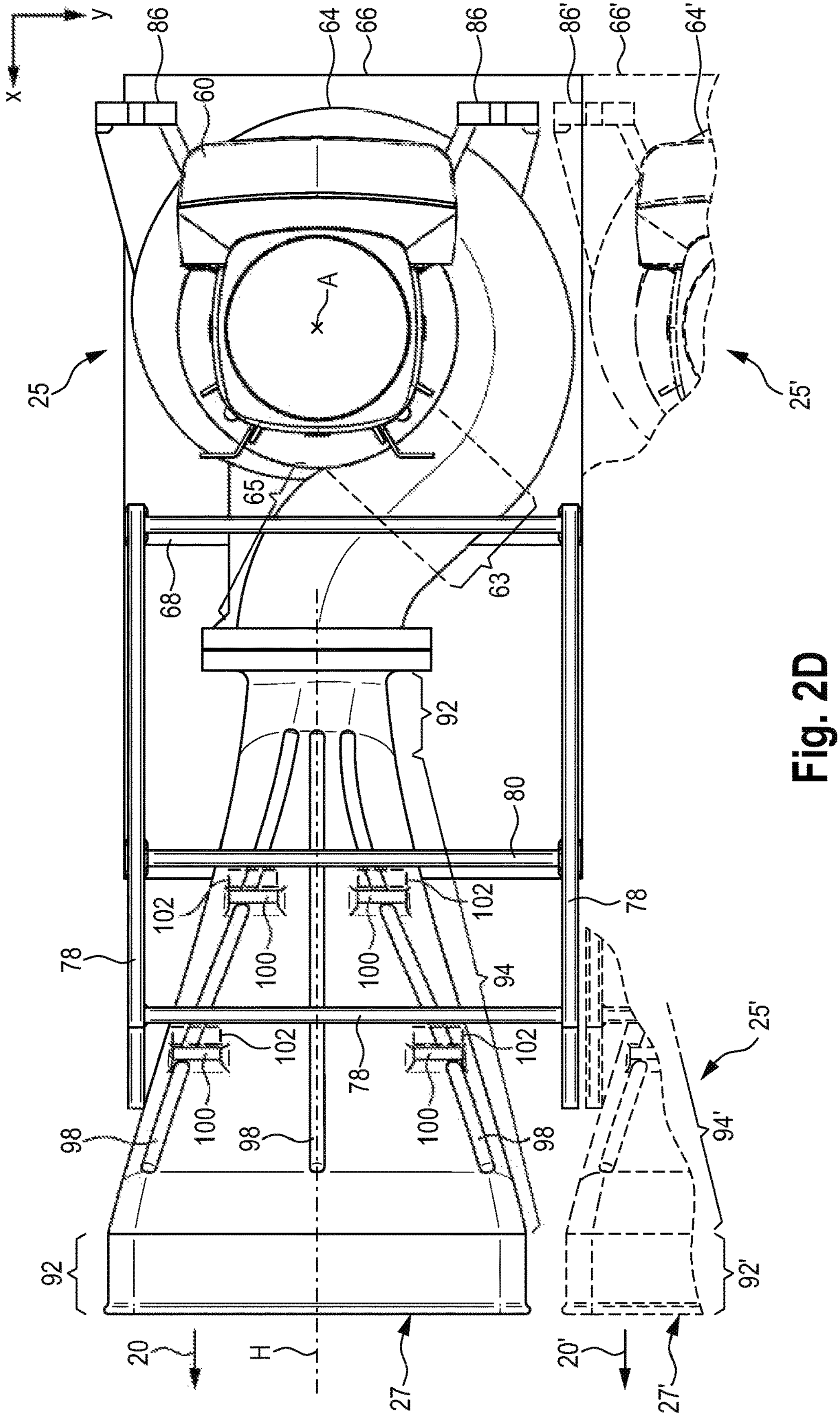

The diffusor 27 comprises—along its main axis H oriented parallel to the longitudinal direction X in an assembled state—an inlet portion 92, a cross-section changing portion 94 and an outlet portion 96, as shown in FIG. 2D. The change of cross section will be explained in more detail with reference to FIG. 5.

The inlet portion 92 is formed and aligned such that the flow exiting the pump housing 64 enters the diffusor 27 tangentially as smoothly as possible, i.e. without energy loss. The inlet portion 92 receives the tangential orientation, and deflects same softly towards the main axis H. The portions 94 and 96 are oriented parallel to the main axis H. The portions 94 and 96 are formed—contrary to the portion 92—circular or mirror-symmetrical.

Preferably, the diffusor 27 is manufactured as an injection molded, or deep-drawn, element. The diffusor can comprise, at its outer surface, in particular at its top side and bottom side, stiffeners 98 extending along the main axis H. The stiffeners 98 suppress vibrations and provide stability to the diffusor 27. In addition, the stiffeners 98 take care that the diffusor 27 in operation keeps its shape and remains aligned along the flow direction X.

FIGS. 2C and 2D show that the pump cell 25 can have overhangs in the transverse direction Y which protrude beyond the base plate 66. In particular, one of the housing feet 86 and the portions 92 and 94 of the diffusor 27 protrude beyond the base plate 66 in the negative direction Y.

When setting up a pump assembly 24 consisting of several pump cells 25, the base plates 66 of the cells 25 are arranged abutting to each other in the transverse direction, as illustrated in FIG. 2D. In FIG. 2D a second cell 25' is indicated by parts below the actual cell 25 by means of dashed lines. The foot 86' of the cell 25' overlaps the cell 25 in the transverse direction Y. The same applies for the portions 92' and 94' of the diffusor 27'. The cells 25 and 25'-and thus the water jets thereof—can be aligned correctly to each other by positioning the ground plates 66 and 66 to each other only. Thus, the pump assembly 24 is arbitrarily scalable along the width.

Further, one or more mounting lugs 100 can be provided at the outer surface, and in particular on the top side, of the diffusor 27. The diffusor 27 is connected to and aligned via the mounting lugs 100 with the frame 71—and thus to and with the frame 28. Damping elements 102 (e.g., Silent blocks), as indicated by dashed lines in FIGS. 2B and 2D, can be arranged between the mounting lugs 100 and the frame 71. The damping elements 102, the mounting lugs 100, and the frame 71 can be connected to each other, for example, by (not illustrated) screws which are preferably oriented horizontally.

In addition to reshaping and enlarging the cross-sectional area, the diffusor 27 has the function to overcome a height difference H2 (cf. FIG. 2B) between the water surface, or the pump outlet, and the surfing surface 40. The portion 94 of the diffusor 27 is slightly inclined relative to the horizontal, preferably in an angular range of 20°-45° and in particular at 30°, as shown in FIG. 2B. Such flat inclination angle causes less energy loss during the deflection of the flow than at 90° deflection.

FIG. 5 illustrates the change and expansion of the cross section from the pump outlet (i.e. diffusor inlet) to the diffusor outlet.

FIG. 5A shows the diffusor 27 of FIG. 2 alone in a side view. The FIGS. 5B-H show the sections along the lines B-B to H-H in FIG. 5A.

FIG. 5B shows the cross-sectional area of the diffusor 27 at the interface between the diffusor 27 and the pump 26, cf. also FIG. 2B. The cross section is circular and has a diameter of 150 mm.

The FIGS. 5C-G show the change of the cross section downstream, i.e. towards the outlet opening 84. A width of the cross section increases continuously, whereas a height decreases. The cross section changes its shape from circular to substantially rectangular flat (cf. FIG. 5H). The cross-sectional area is increased from about 17,687 $mm^2$ to 22,037 $mm^2$, i.e. about 20%. The flow speed at the outlet decreases correspondingly (e.g. from almost 25 km/h to about 20 km/h), which comes pretty close to the travelling speed (15 km/h) of a real wave. The outlet cross section has a width 1 of about 50 cm and a height H3, cf. FIG. 5H, of about 45 mm.

The length L1 of the diffusor 27 is, for example, 800 mm at a height difference H4 of, for example, 480 mm. The length L2 of the portion 92 is, for example, 100 mm.

Returning to FIG. 1, it has proven to be advantageous if the pump assembly 24 has a high dead weight, because in this case the pump assembly 24 fixes the remaining elements, in particular the surfing surface 40 within the basin 12, even during operation of the standing wave.

However, if a basin-external fixation is desired, this can be achieved, for example, by the starting jetty 54, which can form a further optional module of the facility 10. The starting jetty 54 comprises the (horizontally oriented) platform 56, which preferably stands on (vertically oriented) feet 58, cf. FIG. 1B. The feet 58 can be (externally) anchored to the ground.

The platform 56 is provided at a height allowing the surfer to enter the surfing surface 40 at the height of the outlet area 32 of the pump assembly 24. Typically, the platform 56 is positioned (in the longitudinal direction X) above and behind the pump assembly 24, and preferably extends over the entire width (e.g., 4 m) of the surface 40 (cf. FIG. 1A).

The starting jetty 54 can further comprise a stair (not shown) allowing the user to enter the platform 56.

LIFT OF REFERENCE NUMERALS

10 surfing facility
12 basin
14 bottom
16 sidewall
18 water reservoir
20 water flow
22 supporting structure
24 pump assembly
25 pump cell
26 pump
27 diffusor
28 pump frame
30 intake area
32 outlet area
34 wedge
36 return element
38 membrane
40 surface, surfable
42 long leg of 22
44 short leg of 22
45 outlet opening of 26
46 tensioning elements
48 holes/eyelets in 38 and 46
50 (tensioning) forces
52 cross beam
53 bag
54 starting jetty
55 cladding element
56 platform/stage
58 feet of 54
60 motor
62 (shaft) coupling
64 pump housing
63 pipe portion of 64
66 base plate of 28
68 mounting plate
70 feet
71 frame
72 sealing
74 suction ring
76 legs of 71
78 beams
80 strut
82 connection member
84 outlet opening of 27
86 feet of 64
88 intake direction
90 outlet direction
92 inlet portion of 27
94 cross-section deforming portion
96 outlet portion of 27
98 stiffener
100 mounting lug
102 damping elements
H1 water-filling height
H2 height difference

The invention claimed is:

1. A pump cell for a surfing facility, wherein the pump cell is configured to generate a layer-like water flow for a surfable standing wave, wherein the pump cell comprises:
a pump being radial pump and having an outlet opening;
a diffusor coupled to the pump, and configured to enlarge a cross-sectional area of the water flow downstream of the pump as far as an outlet opening of the diffusor and to reshape same into a wide and flat shape; and
a pump frame to which the pump and the diffusor are fastenable,
wherein the pump comprises a pump housing, wherein the pump housing, when the pump cell is used in the surfing facility, has a vertically oriented inlet opening, wherein the outlet opening of the pump is oriented horizontally.

2. The pump cell of claim 1, wherein the outlet opening of the pump is circular.

3. The pump cell of claim 1, wherein the pump further comprises a motor being positioned outside a water reservoir, when the pump cell is used in the surfing facility, and comprising a drive shaft which is oriented vertically.

4. The pump cell of claim 1, wherein the pump frame comprises:
a base plate;
a mounting plate, which is arranged, preferably via feet, spaced apart from the base plate for forming an intake area of the pump, and is fixedly connected to the pump and the base plate; and
a frame configured to couple the diffusor in a predetermined orientation, which is parallel to a desired flow direction, to the base plate.

5. The pump cell of claim 1, wherein the diffusor comprises, in a consecutive manner, downstream:

an inlet portion comprising at a downstream end a cross section corresponding to an outlet cross section of the pump, and redirecting the water flow, which exits the pump horizontally, in an angle of preferably 20°-45° upward relative to the horizontal;

a cross-section deforming portion configured to perform a continuous, preferably constant along a main axis, cross-section enlargement and reshaping into a rectangular shape having a width many times greater than a height; and an outlet portion configured to redirect the water flow back to the horizontal.

6. The pump cell of claim 1, wherein the pump is not self-priming and is operated without a backing pump.

7. A surfing facility, comprising:

a, including at least one pump cell in accordance with claim 1; and a supporting structure, preferably inflatable, configured to float on top of a water reservoir, wherein the basin, wherein the basin is formed by a basin bottom and a sidewall.

8. The surfing facility of claim 7, further comprising a membrane defining a surfable surface, and being coupled laterally to the supporting structure and frontally to the frame.

9. The surfing facility of claim 7, further including the basin.

10. The surfing facility of claim 7, having a modular structure, and being configured to be transported.

11. The use of a pump cell according to claim 1 in a surfing facility for generating a layer-like water flow for a surfable standing wave, wherein the radial pump is used in a lying orientation, in which an inlet opening of the pump is oriented vertically and an outlet opening is oriented horizontally.

12. A use of a radial pump in a surfing facility as a pump in a pump cell for generating a layer-like water flow for a surfable standing wave, the pump cell comprising a diffusor coupled to the pump and configured to enlarge a cross-sectional area of the water flow downstream of the pump as far as an outlet opening of the diffusor and to reshape same into a wide and flat shape; and wherein the radial pump is used in a lying orientation, in which an inlet opening of the pump is oriented vertically and an outlet opening is oriented horizontally.

* * * * *